United States Patent [19]

Fujita et al.

[11] 4,170,899

[45] Oct. 16, 1979

[54] METHOD AND APPARATUS FOR MEASURING GAS FLOW SPEED

[75] Inventors: Tetsuya T. Fujita, Chicago, Ill.; Alfred J. Bedard, Jr., Boulder, Colo.

[73] Assignee: The United States of America as represented by the Secretary of Commerce, Washington, D.C.

[21] Appl. No.: 895,340

[22] Filed: Apr. 11, 1978

[51] Int. Cl.² .......................... G01W 1/00; G01F 1/34
[52] U.S. Cl. ..................................... 73/189; 73/205 R
[58] Field of Search ................... 73/189, 205 R, 213, 73/211

[56] References Cited

U.S. PATENT DOCUMENTS

| | | | |
|---|---|---|---|
| 2,057,767 | 10/1936 | Collins | 73/205 R |
| 3,055,216 | 9/1962 | Wappner | 73/189 |
| 3,105,383 | 10/1963 | Cartwright et al. | 73/189 |
| 3,359,795 | 12/1967 | Walsh | 73/189 |
| 3,805,612 | 4/1974 | Shiba | 73/211 |
| 3,838,598 | 10/1974 | Tompkins | 73/211 |
| 3,939,708 | 2/1976 | Greer et al. | 73/213 |

Primary Examiner—Anthony V. Ciarlante
Attorney, Agent, or Firm—Eugene J. Pawlikowski; Alvin J. Englert

[57] ABSTRACT

A method and apparatus for measuring the speed of a gas stream, particularly suitable for use in detecting wind speed, utilizes the gas flow to create a negative pressure across a pressure sampling port oriented with its axis substantially perpendicular to the gas flow, the negative pressure being created by accelerating the gas flow stream lines over a surface of revolution containing the port. The negative pressure is compared with a reference pressure by means of a pressure transducer whereby the transducer output is representative of the speed of the gas. In a preferred form, the apparatus comprises a first pressure probe in the form of a sphere mounted on a tube projecting axially from a hollow cylindrical cup-like member with the sampling port formed in the base of the sphere and the cup-like member forming a second pressure probe with a pressure tapping internally of the cup providing the source of reference pressure.

9 Claims, 1 Drawing Figure

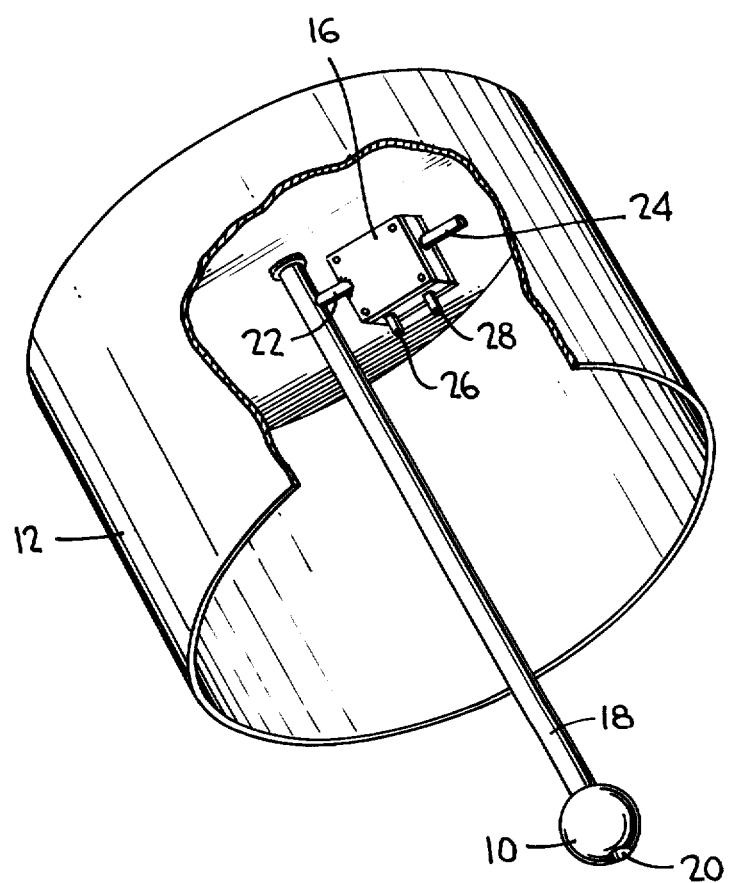

METHOD AND APPARATUS FOR MEASURING GAS FLOW SPEED

BACKGROUND OF THE INVENTION

1. Field of the Invention:

The invention relates to a method and apparatus for measuring gas flow speed by direct pressure measurement and finds particular application as a wind speed threshold detecting means.

There is a need for the development of surface sensors for use in preventing wind-shear related accidents particularly at airports and it is for this application that the development of a gas speed measuring means in accordance with the present invention is particularly, though not exclusively, directed. In this respect, there is a need for surface sensors of high reliability that can be obtained at reasonable cost for use in large numbers. Further, it is desirable to employ wind speed detectors which will in the ideal, measure wind speed irrespective of its direction and which will be relatively insensitive to tilt or wind angle. Thus, the present invention is directed primarily to the provision of apparatus which is concerned with the measurement of gas flow speed alone rather than its direction of flow and which is substantially insensitive to tilt.

Alternative applications for measuring apparatus in accordance with the invention include, for example, the detection of thunderstorm gust fronts, down-slope wind studies, wind caution signs for roads and bridges as well as wind machine protection and site surveys.

2. Prior Art:

It is a conventional expedient when measuring gas flow velocity, to measure the flow pressure by employing pressure measuring probes in the form of pitot/static tubes. In such arrangements, the tubes are generally aligned to sense the pressures associated with a gas stream flowing in a certain direction relative to the tube entrances and such devices have little sensitivity to variations in flow speed in other directions. This is acceptable in many pitot tube applications when measurement of substantially unidirectional streams is required, for example in aircraft where air speed or head wind or tail wind speed is measured.

Devices have, however, been proposed having sensitivity to changes in direction as well as speed of a gas stream. For example, U.S. Pat. No. 2,789,433 to Goudy, Issued Apr. 23, 1957, specifically discloses apparatus for measuring wind speed and direction and employs a substantially flat disc-like pitot head incorporating a number of pitot tubes, the entrances to which are spaced around the periphery of the head whereby each individual tube is particularly sensitive to gas flow in a particular direction. Opposed pairs of the tubes are grouped together to influence separate pressure transducers in the form of diaphragm switches and the outputs of the transducers are used to activate a comparison circuit, which dependent on the transducer outputs produces a field directly representative of the wind direction and strength. The device is relatively complex in its nature, however, and since the pitot tube inlets, which are the only source of pressure signals, are all spaced around the periphery of the disc-like head, would have little sensitivity to wind flowing in planes other than those generally parallel to the plane of the disc.

BRIEF SUMMARY OF THE INVENTION

It is an object of the invention to provide apparatus for use in measuring the speed of a gas stream, more particularly a wind speed detector, which is capable of measuring the speed of flow irrespective of its direction, while having a low sensitivity to the angle of the wind relative to the horizontal.

It is a further object of the invention to provide apparatus for measuring wind speed which is simple and economical to manufacture and which can be used in diverse applications.

The invention is based on the principle of utilizing a pressure sensing probe to create and register a negative pressure when exposed to a flow of gas, this pressure varying as a function of the speed of the gas, comparing the negative pressure with a reference pressure, which itself may vary with the speed of gas flow, and producing an output dependent on the difference between the compared pressures, the output being representative of the gas flow speed. To obtain the negative pressure, when the device is exposed to a gas stream, the probe is formed as a body of revolution with a pressure sampling port centered on the axis of revolution of the body and the body being used so that when it is exposed to a gas stream flowing in planes substantially perpendicular to the axis of revolution and the axis of the sampling port, the flow stream lines will be accelerated over the body thereby causing a negative pressure to be registered at the sampling port dependent on the speed of flow of the gas stream. By arranging the sampling port on the axis of revolution, the probe is rendered substantially omnidirectional insofar as it is independent of the general direction of flow of the stream within planes substantially perpendicular to the axis of revolution.

Negative pressure signals from the probe are received by a pressure transducer of any conventional form which compares the negative pressure signals with a reference pressure conveniently obtained from a second pressure sensing probe having a different configuration from the first probe so as to register a different pressure from that registered by the first probe when the apparatus is exposed to a gas flow of a particular speed. The transducer output is thereby dependent on the difference between the probe pressures and is a function of the gas velocity.

It is necessary that the second probe also be omnidirectional in its response, i.e., insensitive to changes in gas flow direction in planes substantially perpendicular to the axis of the body of revolution. To this end, the second probe is conveniently in the form of a cylindrical cup-like member having an internal pressure sampling source and the body of revolution forming the first probe, and preferably being in the form of a sphere, is mounted on a tube projecting substantially axially from the cup-like member through its open end with the sampling port in said body of revolution facing away from the cup-like member and being disposed substantially on the axis of the cup-like member. With this arrangement, the internal pressure sampling source registers a pressure which is less negative than that registers by the sampling port and which is substantially static gas flow pressure when the apparatus is exposed to a gas stream flowing in planes substantially perpendicular to the axis of the cup-like member.

A device of the above character, when used as a wind speed detector is preferably mounted in a suspended inverted condition on a substantially vertical axis, with the body of revolution projecting below the cup-like member. In this state, the device is capable of accurately measuring the speed of winds in horizontal and near horizontal planes irrespective of the wind direction but becomes less accurate as the wind angle approaches the vertical tending to equalize the induced probe pressures.

BRIEF SUMMARY OF DRAWING

The single drawing FIGURE is a perspective, partly cut away view of a preferred apparatus made in accordance with the invention for measuring the speed of a gas stream.

DESCRIPTION OF PREFERRED EMBODIMENT

The illustrated apparatus consists of a sphere 10 forming a first omnidirectional pressure sensing probe, a cylindrical, cup-like member 12 forming a second omnidirectional pressure sensing probe and a pressure transducer 16 for receiving pressure signals from the respective probes and producing an output dependent on the difference between such signals.

The sphere 10 is attached to the end of the tube 18 having its other end secured internally to the base of cylinder 12, the tube projecting from the open end of the cylinder and being coaxial therewith. A pressure sampling port 20 is formed on the axis of the sphere facing away from the cylinder, the port communicating through the tube with the transducer 16 via a connection 22, to provide one pressure input source for the transducer. The transducer also receives pressure input signals from the interior of the cylinder via a connection 24 and has output connections 26, 28 by which the transducer output, representative of the difference between the input pressures, can be fed to any suitable readout or display device of conventional form. The transducer itself can likewise be of any known form, mechanical, electrical or otherwise which operates to provide an output which is dependent upon the difference in pressure signals applied thereto. Further, while the transducer is illustrated as being located physically within the cylinder 12, this is not essential and the pressure signals from within cylinder 12 and from the port 20 can equally well be transmitted to a remotely located transducer.

Suitable dimensions for a device as described, which can be made of metal or other materials, are for example, cylinder diameter 6 inches, cylinder depth 4 inches, overall tube length 7 inches sphere diameter 1 inch, sphere sampling port diameter 5/16 inches. Larger diameter sampling ports (e.g., over about 1.7 cms) will assist in deterring water collection and ice formation at the port.

In use as a wind speed detector, the device is preferably mounted in an inverted condition on a substantially vertical axis. Winds flowing in generally horizontal planes, when encountering the sphere will have the stream lines compressed and thereby accelerated over the sphere surface whereby the sampling port 20 registers a negative pressure dependent on the wind speed. The pressure within the cylinder as detected by the connection 24 is less negative than that detected by port 20 at any given wind speed due to the shrouding effect of the cylinder and the device is substantially insensitive to changes in direction of substantially horizontal winds due to the symmetrical nature of the cylinder and sphere. As the general angle of the wind approaches the vertical, the two pressure readings tend to converge making the device less accurate in such conditions but it has been found that this effect is minimized by having the tube 18 and sphere 10 mounted coaxially with respect to the cylinder. Generally the wind speed is deduced from the equation $$U = K(2\Delta P/\rho)^{\frac{1}{2}}$$

where U is the horizontal wind speed, $\rho$ is the air density, $\Delta P$ is the pressure difference between the two probes and K is a calibration constant.

It will be appreciated that numerous modifications can be made within the scope of the invention as defined in the appended claims. For example, the probe port 20 can be screened internally to prevent ingress of insects, dust particles and the like and similar screening can be provided across the cup opening. Such screening increases the stability of the device and stability can also be improved by the provision of small corrugations about the rim of the cup. Further, sphere 10 can be replaced by another body of revolution such as a hemisphere with its hemispherical surface facing away from the cylinder and the cylindrical probe 12 can itself take other forms provided it is adapted to register pressures different from those registered by probe 10 at the same gas flow speeds and provided also that the probe is omnidirectional insofar as being substantially insensitive to change in gas flow direction in planes substantially perpendicular to the axis of probe 10. The device as illustrated however due to its simplicity in structure, provides a particularly economical and effective gas speed measuring device rendering it suitable for use either singly or in an array of such devices as a wind speed detector in airport or like applications.

What is claimed is:

1. Apparatus for measuring the speed of a gas stream by direct pressure measurement, said apparatus comprising:

first pressure sensing means including a body having a surface of revolution and an axis of revolution;

means defining a pressure sampling port in said surface centered on said axis of revolution whereby said port registers a first negative pressure when the apparatus is exposed to a gas stream flowing in planes substantially perpendicular to said axis by acceleration of the gas flow stream lines over said surface, said negative pressure being a function of the speed of flow of the gas stream irrespective of the general direction of gas flow in said planes;

means adjacent said first sensing means for producing a second negative pressure different from said first pressure when exposed to said gas stream, second sensing means for sensing said second pressure and pressure responsive means for receiving pressure signals from each said sensing means and producing an output dependent on the difference between said signals, said output being a function of the speed of the gas stream wherein said means for producing a further negative pressure comprises a hollow cup-like member having a base and side wall means defining an opening opposite said base, the apparatus further including mounting means projecting from said opening, said body being carried by said mounting means externally of said cup-like member.

2. The apparatus of claim 1, wherein said mounting means is an elongate member having an axis coaxial with a longitudinal axis of said cup-like member.

3. The apparatus of claim 1, or 2, wherein said surface of revolution is a portion of a sphere.

4. The apparatus of claim 1, or 2, wherein said body is a sphere.

5. The apparatus of claim 1, wherein said sampling port has a diameter of at least 1.7 cms.

6. Apparatus for measuring the speed of a gas stream by direct pressure measurement comprising:
   a cup-like member having a longitudinal axis;
   mounting means projecting from an open end of said cup-like member;
   a body having a convex surface or revolution facing away from said cup-like member, said body being carried by said mounting means externally of said cup-like member, said surface having an axis of revolution substantially coaxial with said longitudinal axis, a first pressure sensing means comprising a pressure sampling port means in said surface centered on said axis of revolution;
   a second pressure sensing means within said cup-like member; and
   pressure responsive means for receiving pressure signals from said first and second sensing means and for producing an output dependent on the difference between said signals.

7. Apparatus for measuring free-stream gas speed comprising means for producing two different negative pressures when the apparatus is exposed to free-stream gas flow, each of which pressures is a function of the speed of the gas stream, said means including first and second probe means supported in juxtaposition to each other, said probe means having a common axis generally perpendicular to the intended direction of flow of the gas over the probe means and each probe means being symmetrical with respect to said common axis, first and second pressure sensing means associated with said first and second probe means respectively for sensing the negative pressures induced at each probe means, and pressure responsive means for receiving pressure signals from each of said sensing means and producing an output dependent on the difference between said signals, said output being a function of the speed of the gas.

8. The apparatus of claim 7 wherein said first probe means is a cup-like member and said second probe means is supported in juxtaposition to an open end of said cup-like member externally of said cup-like member, the apparatus including mounting means associated with said cup-like member and carrying said second probe means.

9. The apparatus of claim 8 wherein said second probe means includes a convex surface of revolution facing away from said cup-like member and said second sensing means comprises a sampling port in said second surface centered on said common axis.

* * * * *